E. MILLER.
MEAT HOOK.
APPLICATION FILED DEC. 7, 1907.
904,140.  Patented Nov. 17, 1908.
FIG. 1.
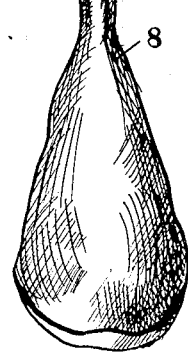
FIG. 2.  FIG. 5.
FIG. 3.  FIG. 4.
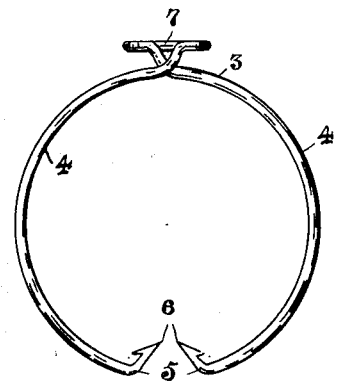 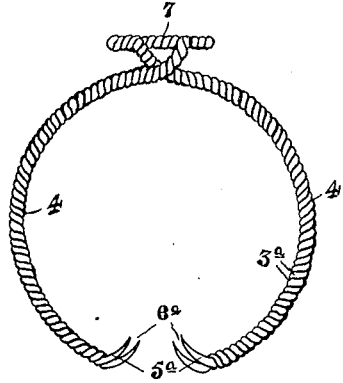
WITNESSES:
Robt F Dilworth
R B Wakefield
INVENTOR
Edward Miller
BY Edward A. Lawrence,
HIS ATTORNEY

UNITED STATES PATENT OFFICE.

EDWARD MILLER, OF HOMESTEAD, PENNSYLVANIA, ASSIGNOR OF ONE-FOURTH TO WILLIAM SANDS AND ONE-FOURTH TO C. W. RUSE, OF HOMESTEAD, PENNSYLVANIA.

MEAT-HOOK.

No. 904,140.        Specification of Letters Patent.        Patented Nov. 17, 1908.

Application filed December 7, 1907. Serial No. 405,372.

*To all whom it may concern:*

Be it known that I, EDWARD MILLER, a citizen of the United States, and residing in the borough of Homestead, in the county of Allegheny and State of Pennsylvania, have invented or discovered new and useful Improvements in Meat-Hooks, of which the following is a specification.

My invention consists of new and useful improvements in hooks or members for the suspension of hams and similar products from the meat sticks in smoke houses &c.

It consists in metal wire or rod bent into double loop form, the lower loop consisting of two converging arms having their ends adjacent and sharpened to engage the load. I prefer also to bend said ends upwardly and inwardly so that the weight of the load will more firmly sink the sharpened ends into the same. The central portion of the wire is crossed and bent into a loop at substantially right angles to the plane of the arms, said last named loop being of the required contour to horizontally engage the vertical projections on the meat stick. By crossing the wire between the loops I obtain an upper loop which will normally fit over the projection loosely enough to be readily engaged and disengaged, but when the load is hanging from the arms, the said loop contracts and snugly clasps the projection so that it cannot be released therefrom without lifting up on the load to permit the loop to expand. I show my hook made either of a single strand of wire or rod, and, also, made of two or more strands in which case the engaging extremities of the arms are multiple, which construction I regard as better fitted for the suspension of bacon or large pieces of meat.

In the accompanying drawings, Figure 1 is a front elevation showing a ham suspended from a meat stick by means of my hook; Fig. 2 is an enlarged elevation of the hook; Fig. 3 is a plan view of the hook, shown in Fig. 2, in place on the meat stick; Fig. 4 is a reduced side elevation of a ham ready for packing for shipment with my hook attached but swung down against the ham so as not to interfere with close storage, and Fig. 5 is a similar view to Fig. 2 of a modification.

The following is a detailed description of the drawings:—1 is a meat stick, preferably of metal and provided with a series of vertical projections, 2—2, which are to be engaged by and to support my hook 3. The hook consists of a wire or rod of metal, having sufficient spring, bent into substantially double loop form, the ends of the wire forming depending arms, 4—4, of the larger, and when in use lower, loop. These arms are preferably arc shape and converge, being preferably provided with upwardly and inwardly bent ends or prongs, 5—5, whose extremities are preferably spear ends, 6—6, adapted to enter the meat. At the top of the lower loop, the wire is crossed on itself and bent into an upper, and preferably smaller, loop 7 which is in a plane substantially at right angles to that of the lower loop. The contour of said loop 7 is such that it normally may be readily slipped down over one of the projections 2 of the meat stick 1. The hook is attached to the ham 8 by slightly spreading the prongs 5—5 and introducing the shank of the ham between the same. The hook is then lifted with the ham depending therefrom so that the weight of the ham tends to drive the prongs 5—5 deeper into the meat, more securely gripping the same. The upper loop 7 is now placed over the desired projection 2, the weight of the ham being relieved from the hook to allow the loop 7 to expand to its normal size which permits it to slip easily down over the projection. The ham is then released allowing its entire weight to be exerted on the hook thus contracting the upper loop 7 because of the crossing of the wire and gripping the projection 2 with the full force of the weight of the load. To release it from the meat stick, the weight of the ham is eased off the hook, allowing the loop 7 to expand to its normal size when it may readily be lifted from the projection and the ham taken down without disturbing adjacent hams on the same meat stick. To release the ham from the hook, the weight of the ham is eased slightly and the arms 4—4 forced downwardly and outwardly out of engagement with the meat.

In the modification shown in Fig. 5, the hook is constructed by twisting together two or more strands of wire or rods, $3^a$—$3^a$, the ends of the twisted strands being separated and bent up as at $5^a$—$5^a$, and sharpened, as at $6^a$—$6^a$. The multiple engaging points provided in this type of hook adapt it particularly to the suspension of sides or pieces of bacon. If desired, lighter material may be used for this type of hook.

When hams after smoking, are stored or shipped, the hooks need not be removed from the hams when taken down from the meat sticks but may be swung down against the surface of the hams, as in Fig. 4, out of the way so as not to impede the close packing of adjacent hams. When the hams reach the dealer or consumer, they may again be suspended by means of the hooks until sold or consumed.

It is a common practice either to thread cord loops through holes punched in the hams or meat, or to provide hangers and slip said hooks and hangers longitudinally over the meat sticks. In such cases, to remove a selected ham every one of the hams suspended between it and the free end of the stick must first be removed, to enable the selected ham to be taken down, and then replaced as before. This is a tedious operation as it frequently entails the lifting of fifteen or twenty hams twice and frequently results in breaking a cord loop. By the use of my hooks, any desired ham may be removed from the stick without disturbing the others adjacent. The cord loops becoming quickly saturated with grease, frequently catch fire in the smoke house, allowing the ham to fall and starting a conflagration. This has been a frequent source of distastrous fire in packing establishments. This danger is of course obviated by the use of my invention.

My hooks are of cheap construction, perfectly efficient, and being practically indestructible, may be used over and over again. Their construction renders the accidental falling of a ham impossible while rendering its intentional removal an easy operation.

What I desire to claim is:—

A hook for the purpose described, consisting of metal wire bent into double loop form, the lower loop consisting of converging arms, carrying at their lower extremities engaging-points, and the upper loop being bent at substantially right-angles to the lower loop and formed by crossing the arms of said lower loop, said upper loop being normally of sufficient size to slip easily over the vertical projections of a meat-stick, but binding tightly about the same when the load is suspended from the hook.

Signed at Pittsburg, Pa., this 29th day of November, 1907.

EDWARD MILLER.

Witnesses:
EDWARD A. LAWRENCE,
A. J. HUNTER.